(12) United States Patent
Watanabe et al.

(10) Patent No.: US 8,009,961 B2
(45) Date of Patent: Aug. 30, 2011

(54) ELECTRONIC APPARATUS, PLAYBACK MANAGEMENT METHOD, DISPLAY CONTROL APPARATUS, AND DISPLAY CONTROL METHOD

(75) Inventors: Katsuhiko Watanabe, Saitama (JP); Kenichiro Imai, Kanagawa (JP); Kou Kobayashi, Tokyo (JP); Tetsuo Morimoto, Kanagawa (JP); Ryoko Tokuda, Tokyo (JP)

(73) Assignee: Sony Corporation (JP)

( * ) Notice: Subject to any disclaimer, the term of this patent is extended or adjusted under 35 U.S.C. 154(b) by 505 days.

(21) Appl. No.: 11/586,140

(22) Filed: Oct. 24, 2006

(65) Prior Publication Data

US 2007/0106675 A1    May 10, 2007

(30) Foreign Application Priority Data

Oct. 25, 2005 (JP) ............... P2005-310399
Oct. 31, 2005 (JP) ............... P2005-317030

(51) Int. Cl.
  *H04N 9/80*  (2006.01)
(52) U.S. Cl. .................... 386/243; 707/804
(58) Field of Classification Search ............ 386/243; 707/805
  See application file for complete search history.

(56) References Cited

U.S. PATENT DOCUMENTS

| | | | |
|---|---|---|---|
| 5,917,488 A * | 6/1999 | Anderson et al. | 715/838 |
| 2001/0023436 A1 * | 9/2001 | Srinivasan et al. | 709/219 |
| 2002/0003576 A1 * | 1/2002 | Konishi et al. | 348/232 |
| 2002/0097255 A1 * | 7/2002 | Toyoda et al. | 345/719 |
| 2002/0099661 A1 * | 7/2002 | Kii et al. | 705/51 |
| 2002/0194608 A1 * | 12/2002 | Goldhor | 725/91 |
| 2003/0138236 A1 * | 7/2003 | Um et al. | 386/69 |
| 2004/0128317 A1 * | 7/2004 | Sull et al. | 707/104.1 |
| 2005/0210145 A1 * | 9/2005 | Kim et al. | 709/231 |
| 2006/0064716 A1 * | 3/2006 | Sull et al. | 725/37 |

FOREIGN PATENT DOCUMENTS

| | | |
|---|---|---|
| CN | 1433003 A | 7/2003 |
| JP | 2003037796 A | 2/2003 |
| JP | 2003274332 A | 9/2003 |
| JP | 2004005344 A | 1/2004 |
| JP | 2005117369 A | 4/2005 |
| JP | 2005-293339 A | 10/2005 |

OTHER PUBLICATIONS

Office Action from Japanese Application No. 2005-310399, dated Feb. 2, 2010.

(Continued)

*Primary Examiner* — James Trujillo
*Assistant Examiner* — Dawaune Conyers
(74) *Attorney, Agent, or Firm* — Lerner, David, Littenberg, Krumholz & Mentlik, LLP

(57) ABSTRACT

An electronic apparatus includes a stream data obtaining unit that obtains stream data; a file generating unit that converts the obtained stream data into a predetermined format to generate stream files; a recording unit that records the generated stream files; and an index file generating unit that generates an index file including a plurality of pieces of file information each including first link information linking to each of the stream files recorded in the recording unit. In response to an instruction to register a bookmark during the obtaining of the stream data, a bookmark information registering unit stores bookmark information regarding the bookmark in a memory, records the stream files in the recording unit, records the bookmark information in the recording unit, and records second link information linking to the bookmark information in the piece of file information for the recorded stream file associated with the bookmark.

17 Claims, 15 Drawing Sheets

OTHER PUBLICATIONS

Office Action from Japanese Application No. 2005-317030, dated Feb. 2, 2010.

Office Action from Japanese Application No. 2005-310399 dated Apr. 20, 2010.

* cited by examiner

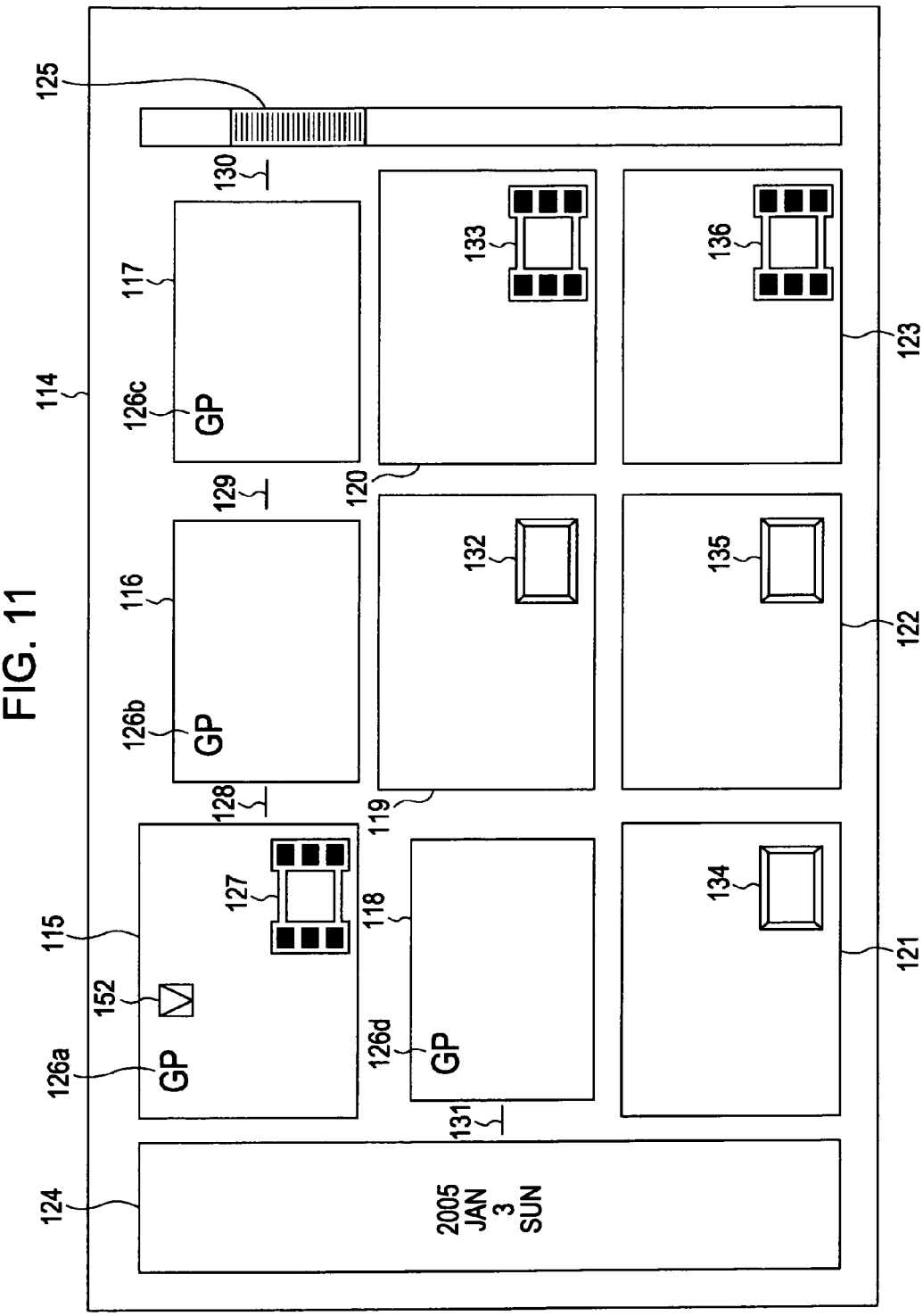

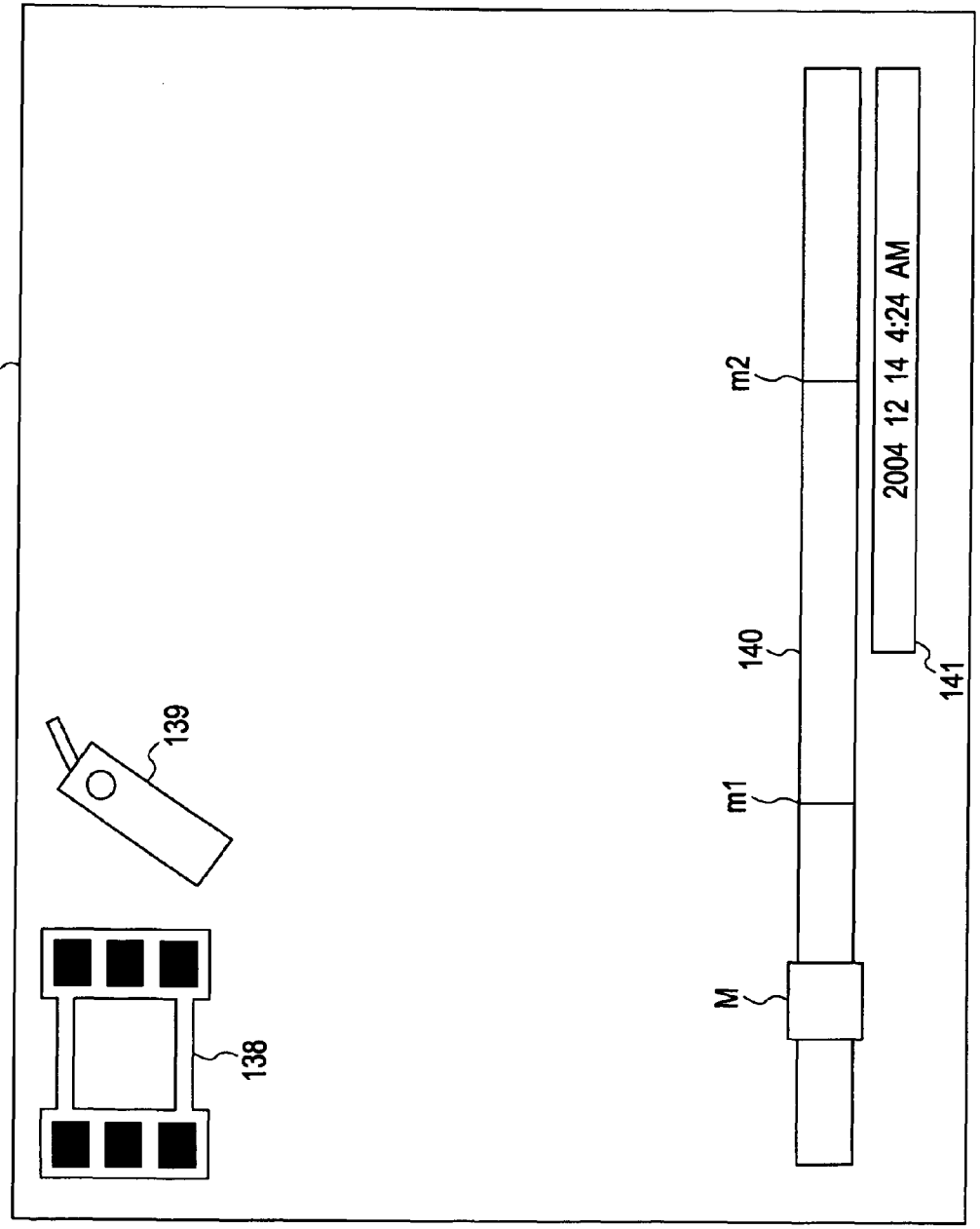

ELECTRONIC APPARATUS, PLAYBACK MANAGEMENT METHOD, DISPLAY CONTROL APPARATUS, AND DISPLAY CONTROL METHOD

CROSS-REFERENCE TO RELATED APPLICATIONS

The present application claims priority from Japanese Patent Application Nos. JP 2005-310399 filed on Oct. 25, 2005 and JP 2005-317030 filed on Oct. 31, 2005, the disclosures of which are hereby incorporated by reference herein.

BACKGROUND OF THE INVENTION

1. Field of the Invention

The present invention relates to electronic apparatuses and playback management methods. More specifically, the present invention relates to an electronic apparatus having a function for managing a playback start position of stream data, and a playback management method for managing a playback start position of stream data.

2. Description of the Related Art

A disc playback apparatus configured to register a bookmark in a moving-image file recorded on a disc and to start playback from the position at which the bookmark is registered has been proposed (see, for example, Japanese Unexamined Patent Application Publication No. 2004-280940). Upon operating a marker key during playback of a moving image, the disc playback apparatus registers as a bookmark the address on the disc currently played back. If the marker key is operated when the disc is not being played back, still images at addresses registered as bookmarks are displayed as thumbnail images. When a marker number corresponding to one of the displayed thumbnail images is selected, the disc playback apparatus starts to play back the disc from the address corresponding to the selected marker number.

In the invention disclosed in the above-mentioned publication, information for managing bookmarks is described in a dedicated table. In order to play back a moving image file, both a file managing the moving image file and a table managing bookmarks are accessed.

Further, in the invention disclosed in the above-mentioned publication, registration of a bookmark is achieved by displaying a marker display section serving as a menu screen and performing settings of the bookmark on the marker display section. However, if the menu screen is displayed during playback of moving image data, a moving image being viewed by the user will be interrupted. The above-mentioned publication discloses a technique for registering a bookmark during a playback operation but does not disclose a technique for registering a bookmark during a recording operation.

Further, in the invention disclosed in the above-mentioned publication, a dedicated menu screen for selecting a bookmark is displayed before the bookmark is selected. The menu screen displays only still images of addresses registered as bookmarks, but does not present information indicating which file is associated with each of the bookmarks and from which a file is to be played back.

It is therefore desirable to provide an electronic apparatus capable of registering a playback start position of stream data without interrupting the recording and/or playback of the stream data.

It is further desirable to provide a display control apparatus and method for receiving a selection of a playback start position while providing a user with information regarding playback start positions registered in stream data.

SUMMARY OF THE INVENTION

According to embodiments of the present invention, in an electronic apparatus and a playback management method, bookmark information is stored in a memory in response to an instruction to register a bookmark during recording of stream data. After all the stream data is recorded in a recording unit, the bookmark information stored in the memory is registered in an index file, and is linked to file information of the stream data.

According to embodiments of the present invention, in an electronic apparatus and a playback management method, a file and an index file are read from a predetermined recording medium, and the file is played back from the beginning based on file information in the index file or from a playback start position described in bookmark information in the index file.

According to another embodiment of the present invention, in a display control apparatus, when a stream file in which a bookmark is registered is input, a selection screen is generated on which an image representing the stream file and an image representing a bookmark registration position at which the bookmark is registered are sequentially arranged.

According to another embodiment of the present invention, a display control method includes inputting a stream file in which a bookmark is registered; generating a selection screen on which an image representing the scream file and an image representing a bookmark registration position at which the bookmark is registered in the stream file are sequentially arranged; and starting playback of the stream file from the beginning of the stream file when the image representing the stream file is selected on the selection screen, and starting playback of the stream file from the bookmark registration position as a playback start position when the image representing the bookmark registration position is selected on the selection screen.

Therefore, in response to an instruction to register a bookmark during recording of stream data in a recording unit, bookmark information regarding the bookmark is stored in a memory, and the bookmark information stored in the memory is registered in an index file after the stream data is obtained. Thus, a bookmark can be registered even during recording of stream data.

Further, file information describing an attribute of a file, a thumbnail image representing the content of the file, and bookmark information describing information regarding a bookmark are managed using a single file called an index file. The access time to the management information can therefore be reduced.

Further, images representing stream files and images representing positions at which bookmarks are registered in the stream files are sequentially arranged. Thus, different objects such as stream files and bookmarks in the files can be seamlessly selected.

Further, images representing moving image files, images representing still image files, images representing audio files, and images representing text files can be arranged on a selection screen. Thus, different types of files to be searched for can be seamlessly selected.

Further, a plurality of images can be displayed side-by-side on a single selection screen, whereby different objects can be selected on the single selection screen without changing screens.

Further, on a view-advancing screen, images representing stream files and images representing positions at which bookmarks are registered may be sequentially displayed one at a time. Since different search objects such as files and bookmarks are displayed by performing the same operation, usability can be improved without a user noticing a difference between the search objects.

BRIEF DESCRIPTION OF THE DRAWINGS

FIG. 11 is a schematic diagram showing a structure of a list view screen;

FIG. 12 is a schematic diagram showing a playback screen;

DETAILED DESCRIPTION

A video camera according to an embodiment of the present invention will be described with reference to the drawings. The video camera according to the embodiment of the present invention has a function for recording moving image data and a function for playing back the recorded moving image data. The video camera can register a bookmark during the recording or playback of moving image data. With the registration of a bookmark, the video camera can play back the moving image data from the position at which the bookmark is registered, that is, can perform an index-search playback operation. Information regarding bookmarks (hereinafter referred to as "bookmark information") is stored in a file called an index file.

The index file includes, in addition to the bookmark information, a structure of a folder, attribute information of files, time information of the bookmarks, and thumbnail images of the files. The video camera manages the information included in the index file, thus improving the access rate.

The index file includes management information for managing not only moving-image files but also various files such as still-image files and audio files. The index file can be used to collectively manage different types of files.

Figure 1:
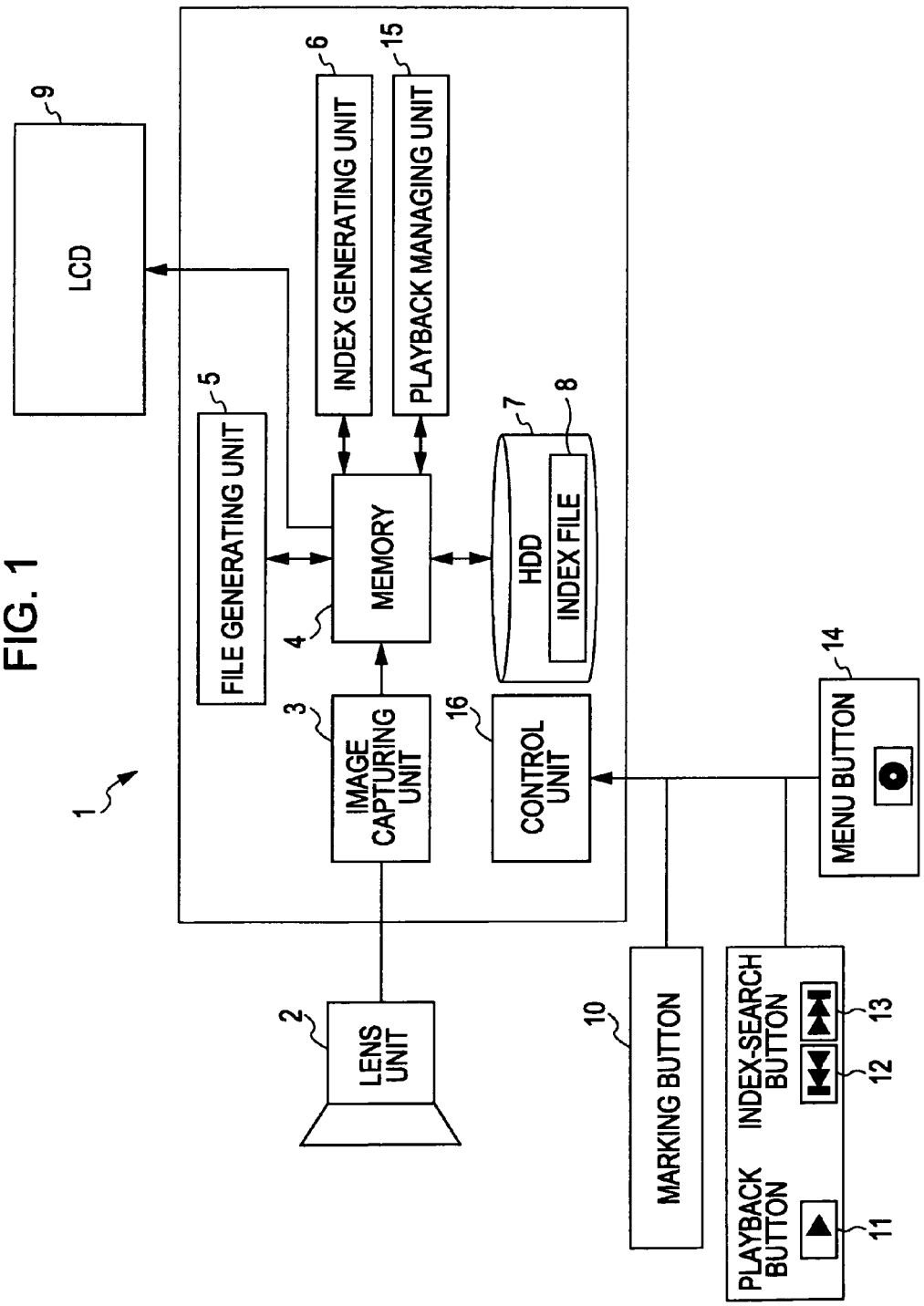
FIG. 1 is a block diagram showing a structure of a video camera according to an embodiment of the present invention.

FIG. 1 shows a video camera 1 according to an embodiment of the present invention. The video camera 1 includes a lens unit 2, an image capturing unit 3, a memory 4, a file generating unit 5, an index generating unit 6, a hard disk drive (HDD) 7, a liquid crystal display (LCD) 9, a marking button 10, a playback button 11, index-search buttons 12 and 13, a menu button 14, a playback managing unit 15, and a control unit 16. The lens unit 2 is used to focus on a subject or to zoom in or out on the subject. The image capturing unit 3 includes an image capturing element such as a charge coupled device (CCD) or a complementary metal oxide semiconductor (CMOS). The memory 4 stores bookmark information and thumbnail images. The file generating unit 5 converts moving image data or still image data into a predetermined file format. The index generating unit 6 generates an index file 8 to be recorded on the HDD 7, and registers a bookmark in the index file 8 during a capturing operation or a playback operation. The LCD 9 displays an image. The marking button 10 is used to register a bookmark, and the playback button 11 is used to input an instruction to start playback. The index-search button 12 is used to send an instruction to perform playback from a previous file, and the index-search button 13 is used to send an instruction to perform playback from a next file. The menu button 14 is used to input an instruction to generate a menu screen. The playback managing unit 15 manages a playback start position, and the control unit 16 controls the overall operation of the video camera 1.

In a process for recording moving image data, the image capturing unit 3 converts light transmitted through the lens unit 2 into moving image data, and stores the moving image data in the memory 4. The file generating unit 5 compresses the moving image data stored in the memory 4 using a predetermined compression method such as MPEG (Moving Picture Expert Group) to generate a moving image file.

Figure 2:
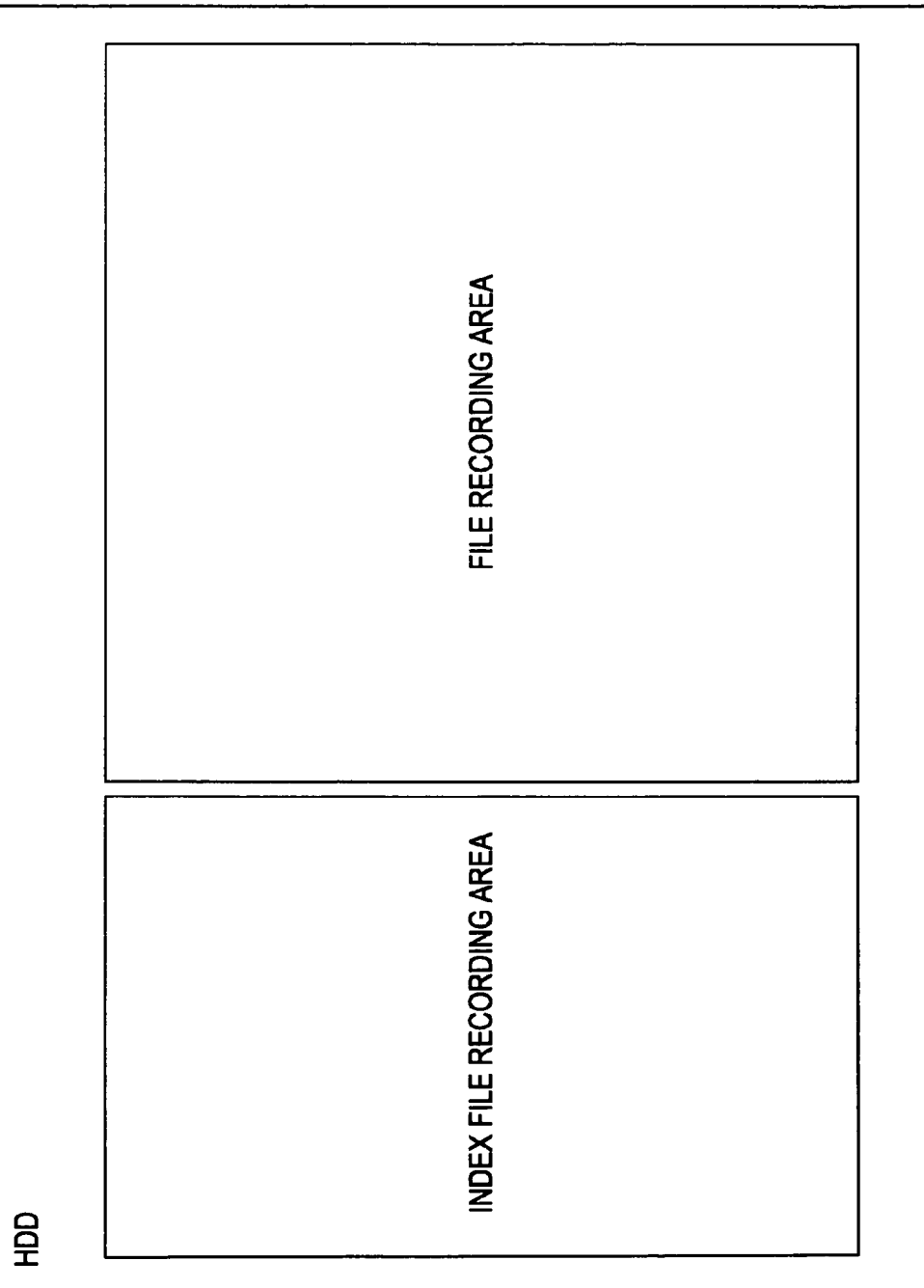
FIG. 2 is a schematic diagram showing a structure of an HDD.

As shown in FIG. 2, the HDD 7 includes a file recording area and an index file recording area. The file generated by the file generating unit 5 is recorded in the file recording area during the capturing of the moving image data. When the capturing of the moving image data is finished, the index file 8 generated by the index generating unit 6 is recorded in the index file recording area.

Figure 3:
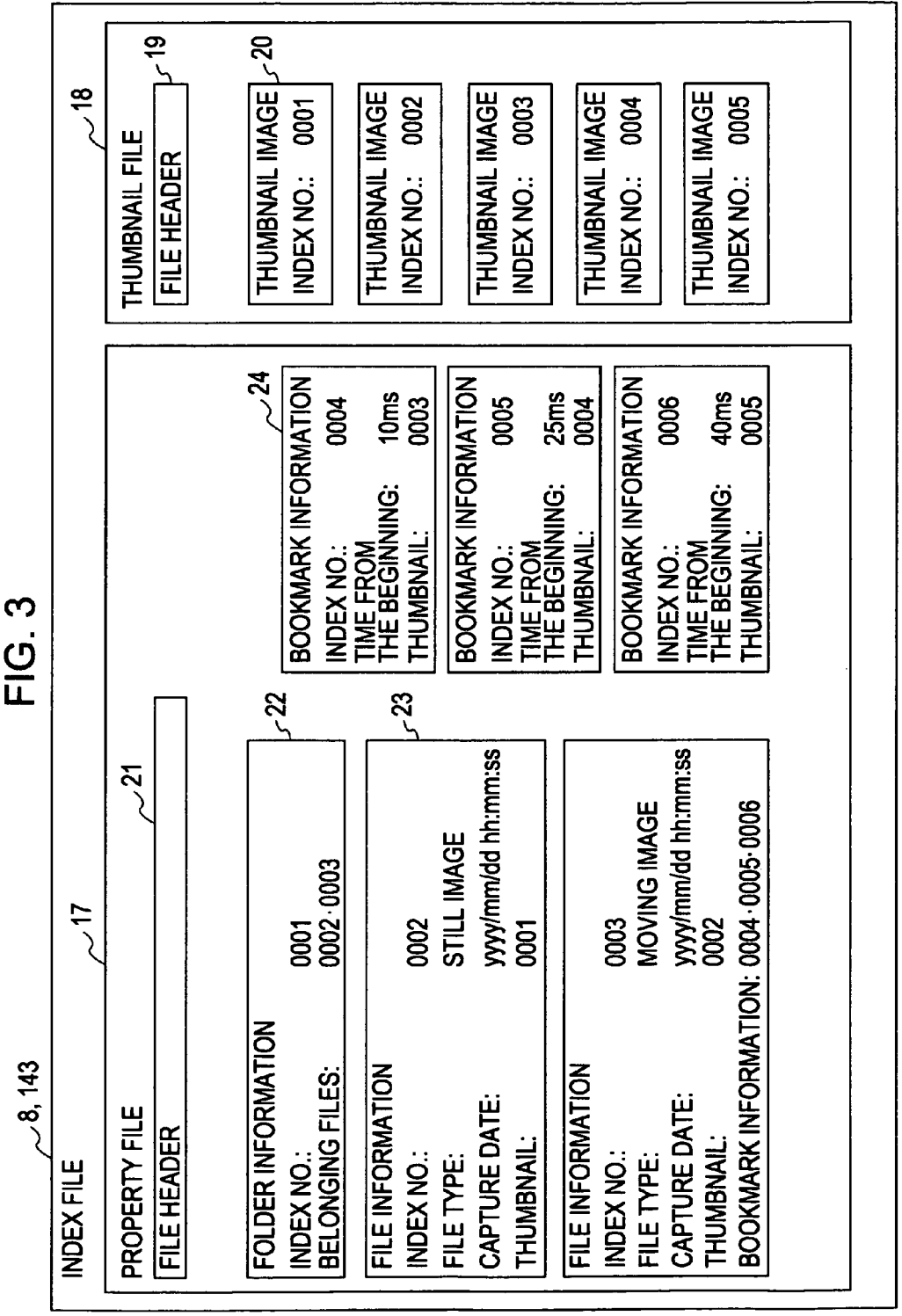
FIG. 3 is a schematic diagram showing a structure of an index file.

FIG. 3 shows an example structure of the index file 8 generated by the index generating unit 6.

As shown in FIG. 3, the index file 8 is formed of a property file 17 and a thumbnail file 18. The thumbnail file 18 includes a file header 19 and thumbnail images 20 representing files and bookmarks.

The property file 17 includes a file header 21, folder information 22 regarding a folder, file information 23 regarding files, and bookmark information 24 regarding bookmarks. Each of the folder information 22, the file information 23, and the bookmark information 24 is assigned an index number for uniquely identifying the information.

The folder information 22 includes an index number of the folder, and index numbers of files belonging to the folder.

The file information 23 includes an index number of a file, a file type, a file creation date, an index number of a thumbnail image 20 linked to the file, and an index number of the bookmark information 24 linked to the file.

In the file information 23, the index number of the file itself is referred to as "first link information." That is, the first link information is information linked to a file such as a moving image file or a still image file. The index number of the bookmark information 24 is referred to as "second link information," and the index number of the thumbnail image 20 is referred to as "third link information."

The bookmark information 24 includes a registration time of a bookmark, and an index number of the thumbnail image 20 linked to the bookmark.

The thumbnail file 18 stores a thumbnail image 20 representing the content of a file, and a thumbnail image 20 that indicates the position of a bookmark registered in the file. The thumbnail image representing the content of a file is referred to as a "first thumbnail image," and the thumbnail image that indicates a position at which a bookmark is registered is referred to as a "second thumbnail image."

Figure 4:
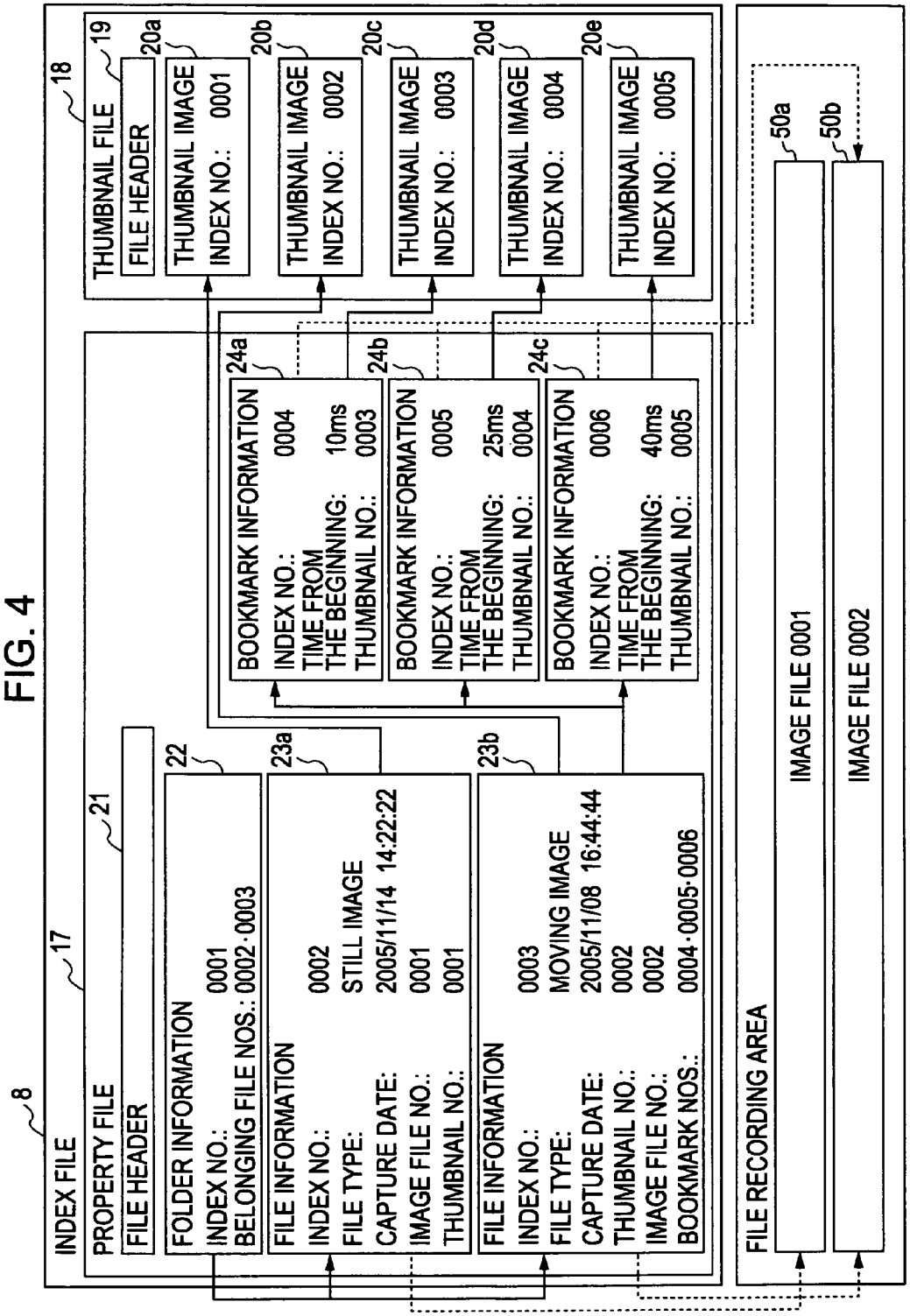
FIG. 4 is a conceptual diagram for providing visual representation of links between folder information, file information, and bookmark information.

Links included in the index file 8 will be described with reference to FIG. 4. The folder information 22 with index number 0001 is described at the top of the property file 17 shown in FIG. 4. The folder information 22 is linked to files belonging to the folder, namely, file information 23a with index number 0002 and file information 23b with index number 0003.

The file information 23a with index number 0002 linked to the folder information 22 has file type "still image," capture date "Nov. 14, 2005 14:22:22," and links to a thumbnail image 20a with index number 0001 and an image file 50a with image file number 0001.

The file information 23b with index number 0003 has file type "moving image," capture date "Nov. 8, 2005 16:44:44," and links to bookmark information 24a with index number 0004, bookmark information 24b with index number 0005, bookmark information 24c with index number 0006, a thumbnail image 20b with index number 0002, and an image file 50b with image file number 0002.

The bookmark information 24a with index number 0004 linked to the file information 23b has time information "10 ms," and a link to a thumbnail image 20c with index number 0003. The time information indicates the time elapsed from the beginning of the file. The bookmark information 24b with index number 0005 has time information "25 ms," and a link to a thumbnail image 20d with index number 0004. The bookmark information 24c with index number 0006 has time information "40 ms," and a link to a thumbnail image 20e with index number 0005.

In the index file 8, therefore, the image file 50 linked to the folder, and the information linked to the bookmark information 24 linked to the image file 50 can be sequentially read. The index file 8 can also be used to read the thumbnail images 20 linked to the image file 50 and the bookmark information 24.

Figure 5:
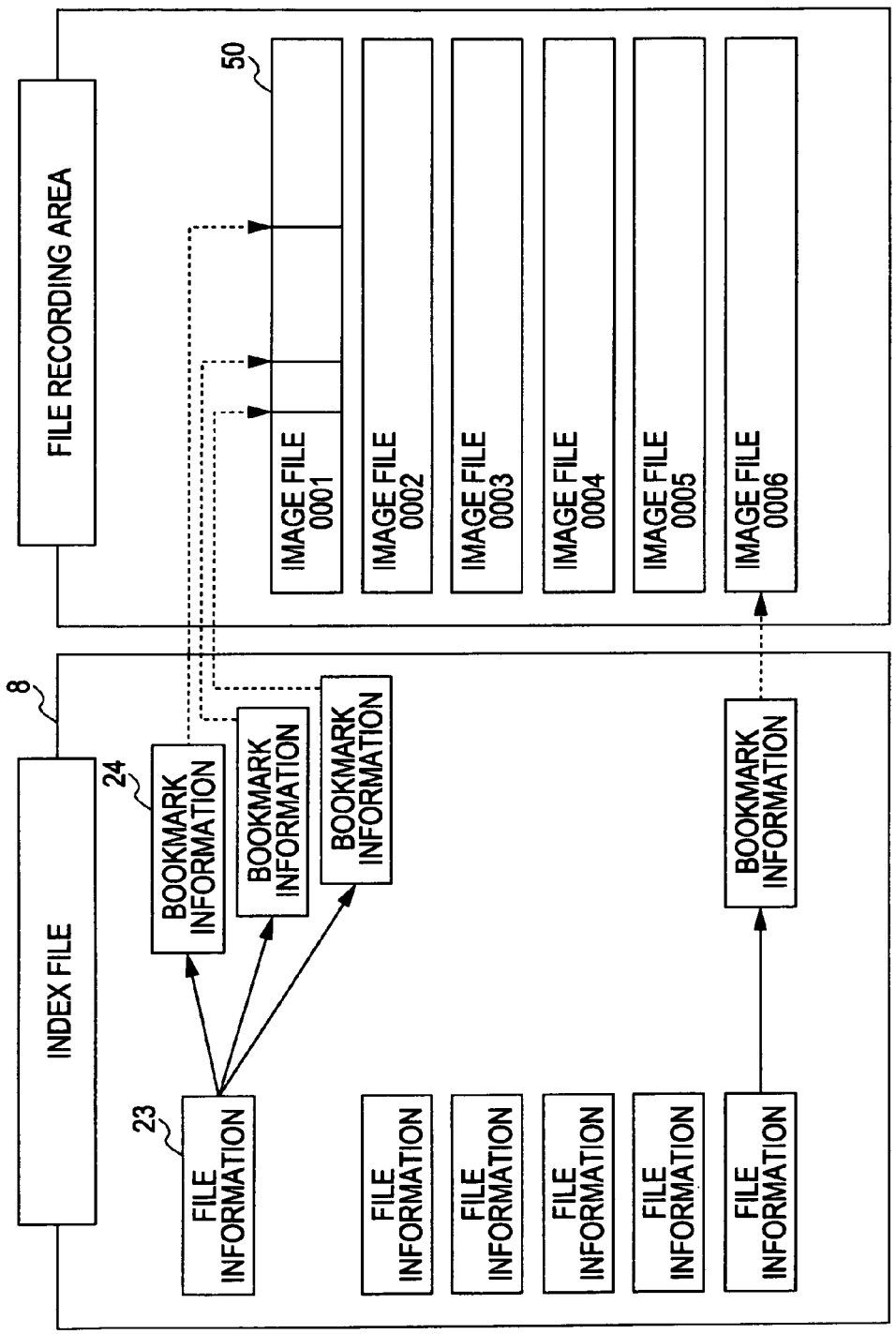
FIG. 5 is a schematic diagram for providing visual representation of links between file information and bookmark information.

FIG. 5 schematically shows the relationship between the file information 23 and the bookmark information 24. In FIG. 5, six pieces of file information 23 and four pieces of bookmark information 24 are illustrated. The first piece of file information 23 is linked to three pieces of bookmark information 24, and the next four pieces of file information 23 are not linked to bookmark information 24. The last piece of file information 23 is linked to a piece of bookmark information 24.

All the pieces of file information 23 and the pieces of bookmark information 24 are managed by the index file 8. In the video camera 1 according to the embodiment of the present invention, since both the file information 23 and the bookmark information 24 are managed using the index file 8, the file information 23 and the bookmark information 24 can be read at the same time. The access time to the bookmark information 24 can therefore be reduced.

The playback managing unit 15 manages a playback start position of a file using the index file 8. When the playback button 11 is pressed, the playback managing unit 15 reads the index file 8 to read the file information 23 linked to the folder information 22 in the index file 8 and to read the bookmark information 24 linked to the file information 23. The playback managing unit 15 then arranges the bookmark information 24 in order of the time information. That is, the pieces of bookmark information 24 registered in the recording operation and the pieces of bookmark information 24 registered in the playback operation are arranged in order of the time information.

When the index-search button 12 is pressed, the playback managing unit 15 searches for the previous playback start position. When the index-search button 13 is pressed, the playback managing unit 15 searches for the next playback start position. If the file has a bookmark, the playback managing unit 15 searches for the bookmark. If the file has no bookmark, the playback managing unit 15 searches for the beginning of the file.

When the menu button 14 is pressed, the playback managing unit 15 reads the thumbnail images 20 linked to the file information 23 and the thumbnail images 20 linked to the bookmark information 24, and generates a menu screen on which the read thumbnail images 20 are arranged. The menu screen displays the thumbnail image 20 of the still image file, the thumbnail image 20 of the moving image file, and a thumbnail image of a music file in a mixed manner. A user operates a direction key (not shown) to select one of the thumbnail images 20. The selected thumbnail image 20 is displayed so as to be highlighted against the other thumbnail images 20.

For a file having a bookmark, the thumbnail image 20 of the file and the thumbnail image 20 of the bookmark are displayed side-by-side. If the thumbnail image 20 of the bookmark is selected, the playback managing unit 15 starts playback from the position at which the bookmark is registered.

Figure 6:
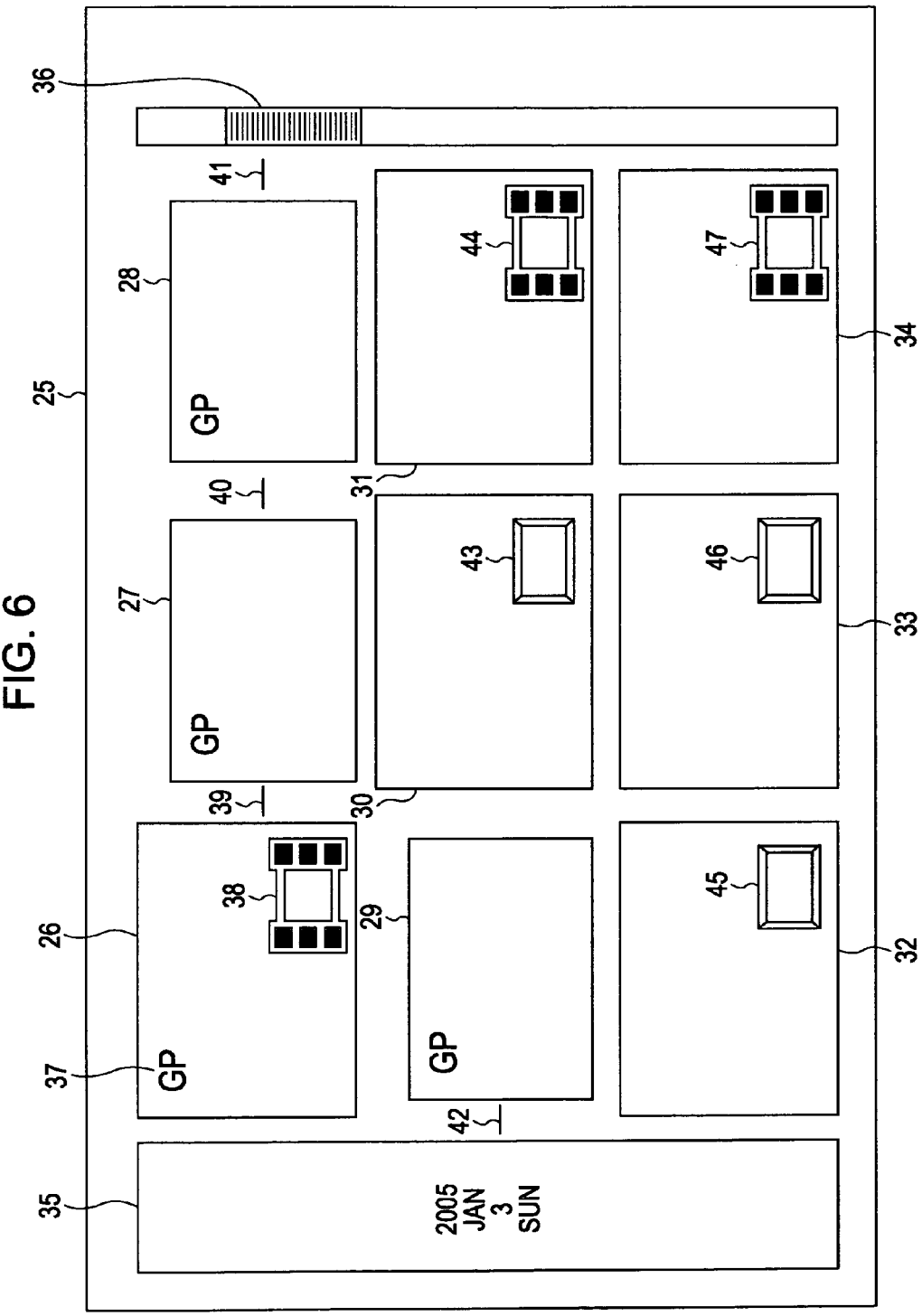
FIG. 6 is a conceptual diagram showing an example of a menu screen for specifying a playback start position.

FIG. 6 shows a menu screen 25. On the menu screen 25 shown in FIG. 6, three thumbnail images in the horizontal direction by three thumbnail images in the vertical direction, i.e., nine thumbnail images 26 to 34, are displayed. A file creation date 35 is displayed on the left side of the menu screen 25. A scroll bar 36 indicating the current position with respect to the total amount of the file is displayed on the right side of the menu screen 25.

The thumbnail image 26 located at the left end of the top row is a thumbnail image of a moving image file. A "GP (group)" sign 37 indicating that there is a registered bookmark and a sign 38 indicating a moving image file are displayed on the thumbnail image 26. The thumbnail image 26 is followed by thumbnail images 27 to 29 of bookmarks. The thumbnail images 27 to 29 of the bookmarks are smaller than the thumbnail image 26 of the moving image file, and are connected to the thumbnail image 26 by crossbars 39 to 42. The menu screen 25 allows a user to visually distinguish the thumbnail image 26 of the moving image file from the thumbnail images 27 to 29 of the bookmarks depending on the size of the thumbnail images 26 to 34 or the presence or absence of the crossbars 39 to 42.

The thumbnail image 30 located in the center of the second row is a thumbnail image of a still image file. A sign 43 indicating a still image is displayed on the thumbnail image 30. The thumbnail image 31 located at the right end of the second row is a thumbnail image of a moving image file. The thumbnail images 30 and 31 are not connected to a thumbnail image of a bookmark, and it is therefore found that there is no registered bookmark.

The thumbnail images 32 and 33 located at the left end and center of the third row are thumbnail images of still image files. Signs 45 and 46 indicating a still image file are displayed on the thumbnail images 32 and 33, respectively. The thumbnail image 34 located at the right end of the third row is a thumbnail image of a moving image file. A sign 47 indicating a moving image file is displayed on the thumbnail image 34.

Figure 7:
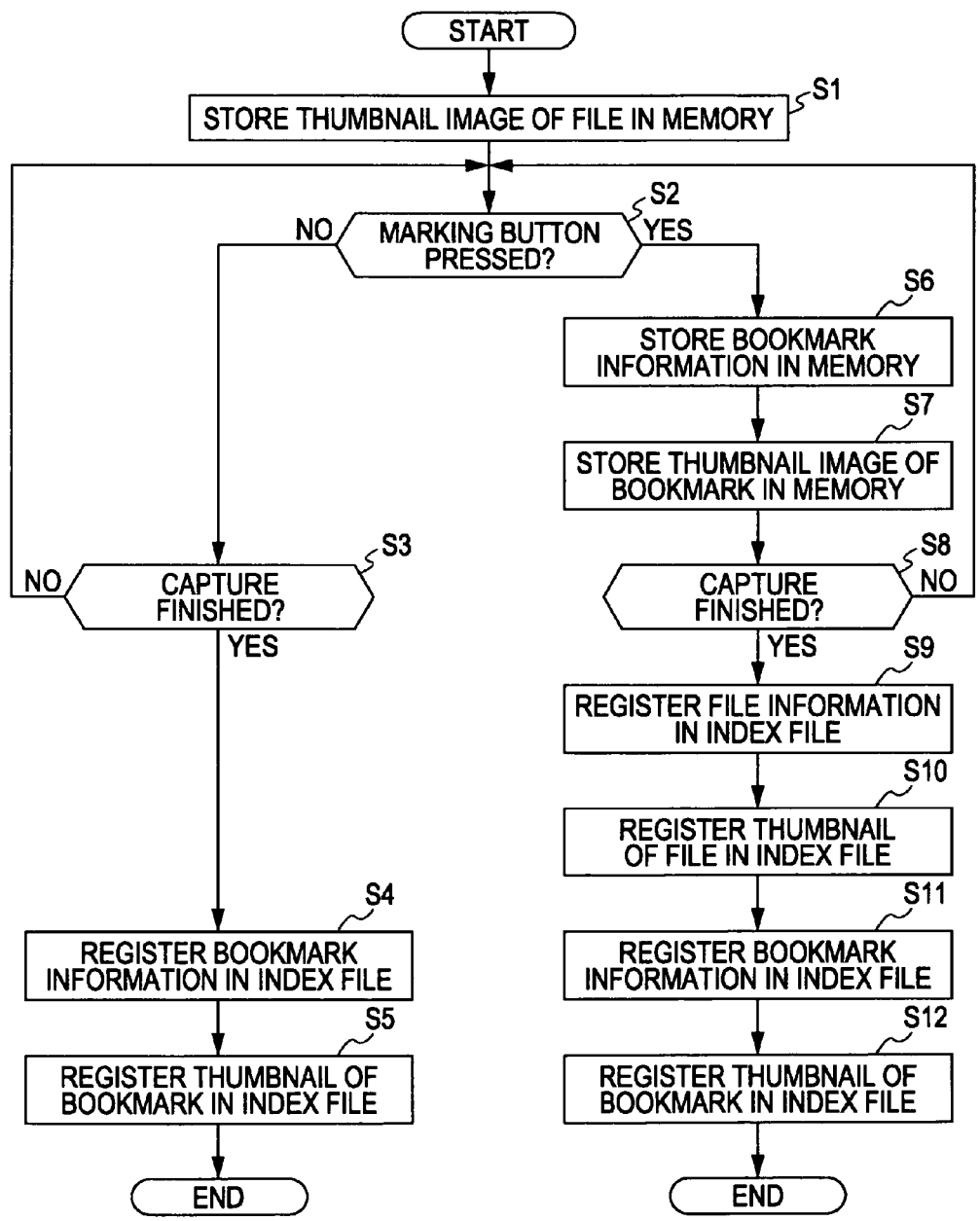
FIG. 7 is a flowchart showing a procedure for registering a bookmark during a capturing operation.
Figure 8:
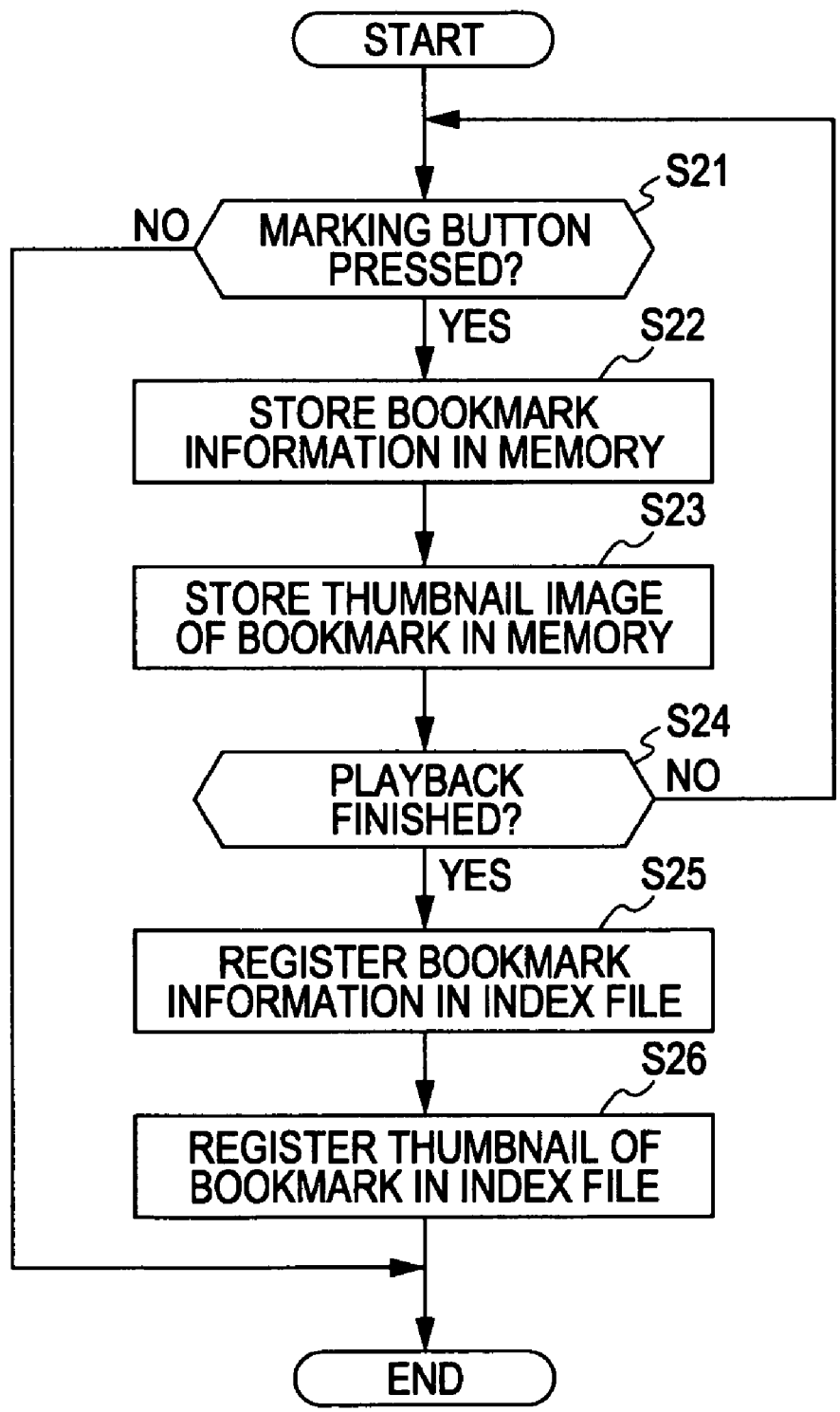
FIG. 8 is a flowchart showing a procedure for registering a bookmark during a playback operation.

A procedure for registering a bookmark will be described with reference to FIGS. 7 and 8. FIG. 7 is a flowchart showing the registration procedure during a recording operation. When the capturing of a moving image file is started, first, the index generating unit 6 stores an image corresponding to the beginning of the file in the memory 4 as a thumbnail image 20 (step S1). If the capturing operation is finished without pressing the marking button 10 (no in step S2 and yes in step S3), the index generating unit 6 generates file information 23 of the captured file, and registers the file information 23 in the index file 8 (step S4). The index generating unit 6 registers in the index file 8 the thumbnail image 20 of the file stored in the memory 4 (step S5).

If the marking button 10 is pressed during the capturing operation (yes in step S2), the index generating unit 6 generates bookmark information 24 based on the pressing time of the marking button 10, and stores the bookmark information 24 in the memory 4 (step S6). The index generating unit 6 further stores an image obtained when the marking button 10 is pressed in the memory 4 (step S7). If the capturing operation is not finished (no in step S8), the process returns to step S2, and the index generating unit 6 waits for the marking button 10 to be pressed.

If the capturing operation is finished (yes in step S8), the index generating unit 6 generates file information 23 of the captured file, and registers the file information 23 in the index file 8 (step S9). The index generating unit 6 then registers in the index file 8 the thumbnail image 20 of the image stored in the memory 4 (step S10).

The index generating unit 6 further registers in the index file 8 the bookmark information 24 stored in the memory 4 (step S11) and the thumbnail image 20 of the bookmark stored in the memory 4 (step S12).

In step S1, as described above, the thumbnail image 20 is generated from the image corresponding to the beginning of the moving image stream when the capturing operation is started. Alternatively, after the capturing operation is finished, the image corresponding to the beginning of the moving image stream may be read to generate the thumbnail image 20, and the generated thumbnail image 20 may be registered in the index file 8. In step S7, as described above, the image obtained when the marking button 10 is pressed during the capturing operation is stored in the memory 4. Alternatively, after the capturing operation is finished, the image corresponding to the bookmark information 24 may be read to generate the thumbnail image 20, and the generated thumbnail image 20 may be registered in the index file 8.

The registration procedure during a playback operation will be described with reference to FIG. 8. If the marking button 10 is not pressed during playback of a moving image file (no in step S21), nothing is registered in the index file 8.

If the marking button 10 is pressed during the playback operation (yes in step S21), the index generating unit 6 generates bookmark information 24 based on the pressing time of the marking button 10, and stores the bookmark information 24 in the memory 4 (step S22). The index generating unit 6 further stores an image obtained when the marking button 10 is pressed in the memory 4 (step S23). If the playback operation is not finished (no in step S24), the process returns to step S21, and the index generating unit 6 waits for the marking button 10 to be pressed.

If the playback operation is finished (yes in step S24), the index generating unit 6 registers in the index file 8 the bookmark information 24 stored in the memory 4 (step S25) and the thumbnail image 20 of the bookmark stored in the memory 4 (step S26).

In step S23, as described above, the image obtained when the marking button 10 is pressed during the playback operation is stored in the memory 4. Alternatively, after the playback operation is finished, the image corresponding to the bookmark information 24 may be read to generate a thumbnail image, and the generated thumbnail image may be registered in the index file 8.

Figure 9A:
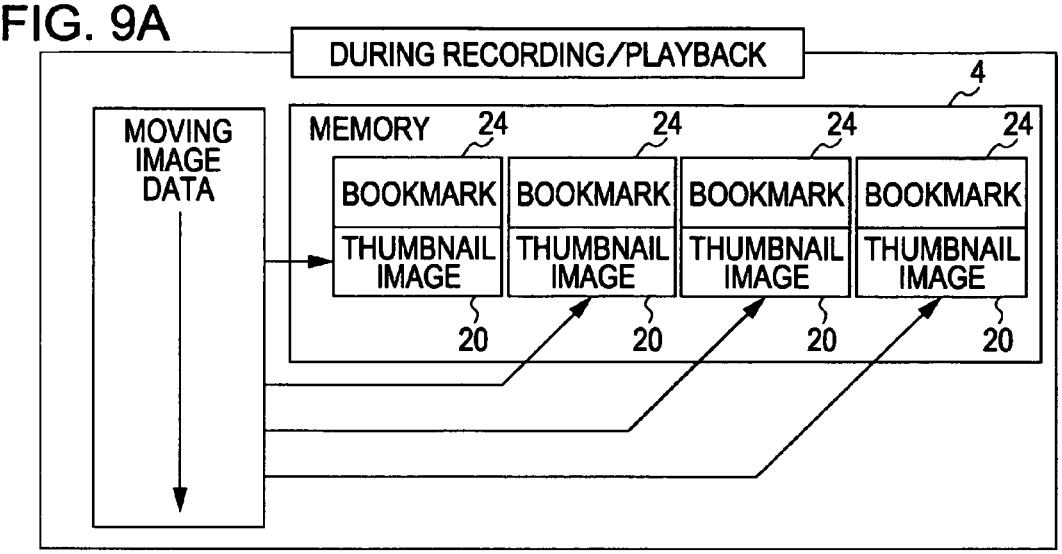
FIGS. 9A and 9B are schematic diagrams showing a bookmark registration process.
Figure 9B:
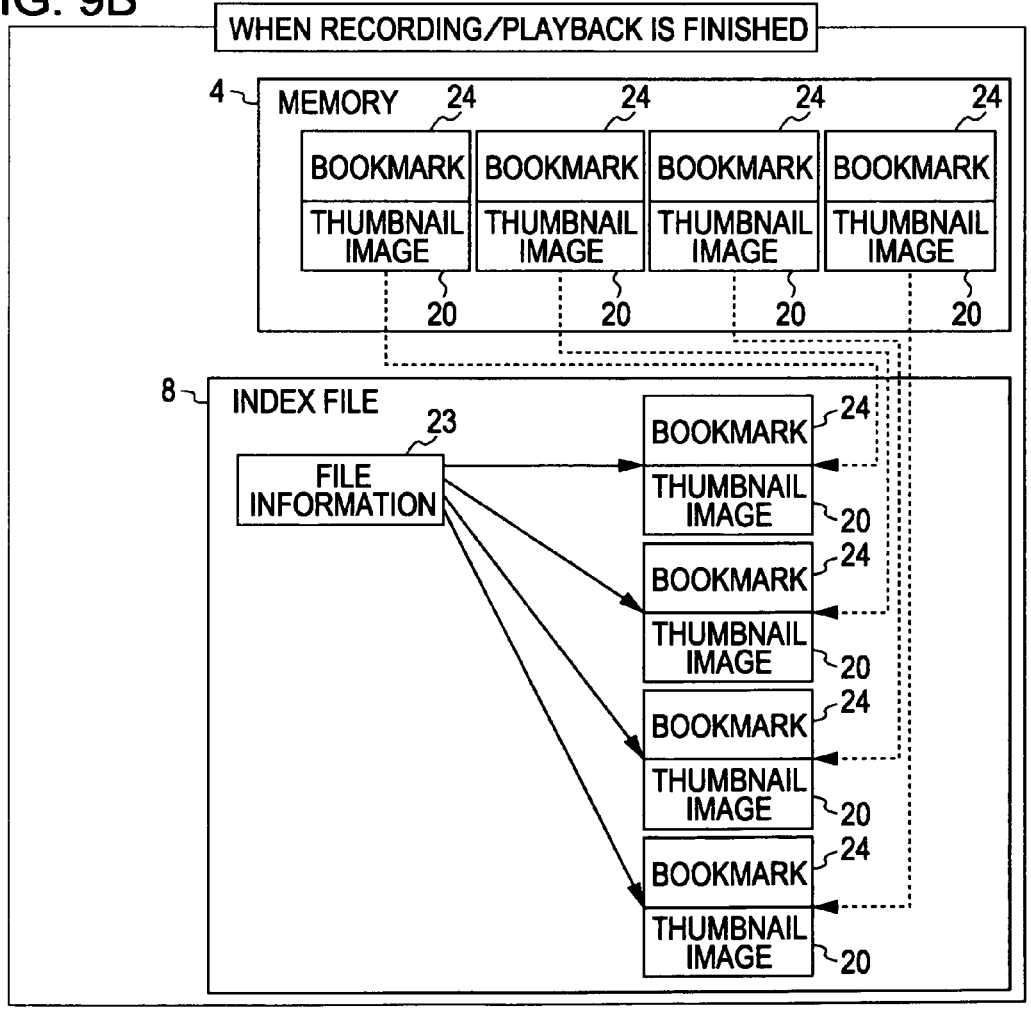

FIGS. 9A and 9B schematically show the bookmark registration process. During the recording or playback of a moving image file, the bookmark information 24 and the thumbnail image 20 of the bookmark are stored in the memory 4 each time the marking button 10 is pressed. As shown in FIG. 9A, the number of pieces of bookmark information 24 and thumbnail images 20 stored in the memory 4 corresponds to the number of times the marking button 10 has been pressed.

When the recording or playback of the moving image file is finished, as shown in FIG. 9B, all the pieces of bookmark information 24 and thumbnail images 20 stored in the memory 4 during the recording or playback operation are registered in the index file 8.

As described above, the video camera 1 according to the embodiment of the present invention can register a bookmark in the moving image data currently recorded or played back. The bookmark is recorded in the index file 8 together with the file information 23 of the moving image file, thus allowing quick access to the bookmark information 24.

Further, in the video camera 1 according to the embodiment of the present invention, multiple pieces of bookmark information 24 are collectively registered in the index file 8 when a recording or playback operation is finished. Thus, the time for accessing the HDD 7 during the recording or playback operation can be reduced to achieve high-speed bookmark registration. During playback of moving image data, the bookmark information 24 may be registered in the index file 8 each time the marking button 10 is pressed.

While the registration of a bookmark in a moving image file has been described, stream data of any file other than a moving image file, such as an audio file, may be used.

While the above embodiment has been described in the context of the video camera 1, an apparatus other than the video camera 1, such as a video tape recorder/player, a music player, a music recorder, or a personal computer, may be used.

Figure 10:
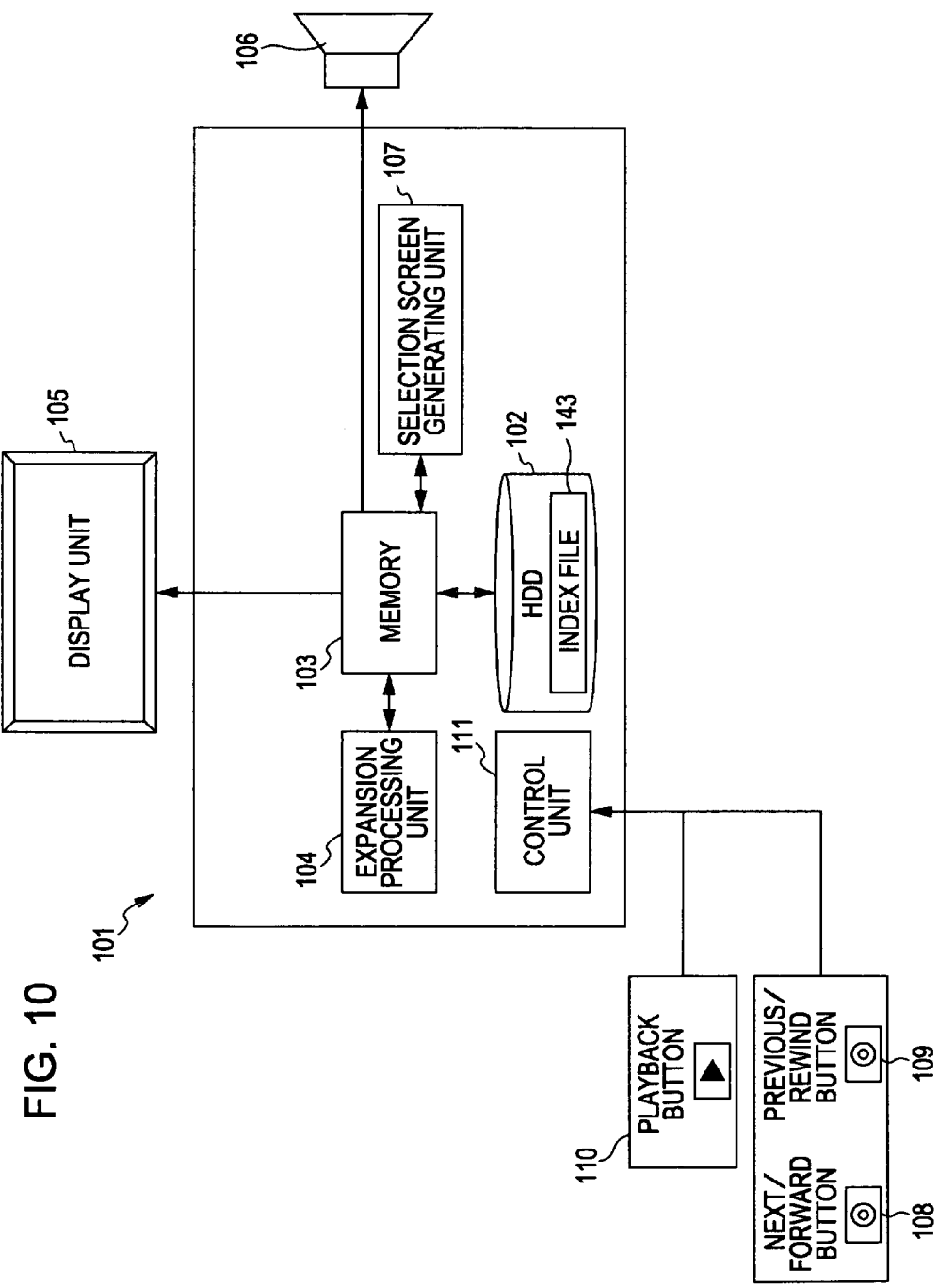
FIG. 10 is a block diagram showing a structure of a playback apparatus.

A playback apparatus configured to play back the thus recorded moving image data in which bookmark information is registered will be described in detail. FIG. 10 shows a structure of a playback apparatus 101. The playback apparatus 101 includes a hard disk drive (HDD) 102, a memory 103, an expansion processing unit 104, a display unit 105, a speaker 106, a selection screen generating unit 107, a next/forward button 108, a previous/rewind button 109, a playback button 110, and a control unit 111. The HDD 102 stores data, and the memory 103 serves as an area for temporarily storing the data. The expansion processing unit 104 expands a file recorded on the HDD 102 to produce a playback signal. The display unit 105 outputs the playback signal as video, and the speaker 106 outputs the playback signal as audio. The selection screen generating unit 107 generates a selection screen for selecting a playback start position. The next/forward button 108 is used to send an instruction to specify a next playback start position, and the previous/rewind button 109 is used to send an instruction to specify a previous playback start position. The playback button 110 is used to send an instruction to start playback. The control unit 111 controls the overall operation of the playback apparatus 101.

As described above with reference to FIG. 2, the HDD 102 includes a file recording area for recording a moving image file and a still image file, and an index file recording area for recording an index file serving as management information of the files recorded in the file recording area.

When a file compressed using a predetermined compression method such as MPEG is read from the HDD 102, the expansion processing unit 104 expands the compressed file using a predetermined method. The display unit 105 displays the playback signal stored in the memory 103 as an image, and the speaker 106 outputs the playback signal stored in the memory 103 as a sound.

The selection screen generating unit 107 generates a selection screen for selecting a playback start position. In the embodiment, a list view screen and a view-advancing screen are generated as examples of the selection screen.

A plurality of thumbnail images are arranged on the list view screen. The thumbnail images include a thumbnail image (hereinafter referred to as a "moving-image-file thumbnail image") representing the content of a file, such as an image corresponding to the beginning of the file, a thumbnail image of a still image obtained when a bookmark is registered (hereinafter referred to as a "bookmark thumbnail image"), and a thumbnail image of a still image file (hereinafter referred to as a "still-image-file thumbnail image"). In the embodiment, a thumbnail image representing a text file or a thumbnail image representing an audio file may be displayed on the list view screen although they are not illustrated.

When one of the thumbnail images is selected on the list view screen, the file corresponding to the selected thumbnail image is played back. FIG. 11 shows a list view screen 114. On the list view screen 114 shown in FIG. 11, three thumbnail images in the horizontal direction by three thumbnail images in the vertical direction, i.e., nine thumbnail images 115 to 123, are displayed. A file creation date 124 is displayed on the left side of the list view screen 114. A scroll bar 125 indicating the position of the file currently displayed on the list view screen 114 with respect to the total amount of the file is displayed on the right side of the list view screen 114.

The thumbnail image 115 located at the left end of the top row is a thumbnail image of a moving image file. A check sign 152 indicating that the file has a bookmark, and a sign 127 indicating that the file type is a moving image file type are displayed on the thumbnail image 115. The thumbnail image 115 is followed by thumbnail images 116 to 118 of bookmarks. The thumbnail images 116 to 118 of the bookmarks are smaller than the thumbnail image 115 of the moving image file, and are connected to the thumbnail image 115 by crossbars 128 to 131. The list view screen 114 allows a user to visually distinguish the thumbnail image 115 of the moving image file from the thumbnail images 116 to 118 of the bookmarks depending on the size of the thumbnail images or the presence or absence of the crossbars.

"GP" signs 126a to 126d are displayed on the upper left portions of the thumbnail images 115 to 118. The "GP" sign 126 is a character representation indicating that the four thumbnail images, namely, the thumbnail images 115 to 118, are associated with one moving image file. In this manner, the bookmark thumbnail images are distinguished not only depending on the image size and the crossbars 128 to 131 but also using the character representation.

The thumbnail image 119 located in the center of the second row is a thumbnail image of a still image file. A sign 132 indicating that the file type is a still image file type is displayed on the thumbnail image 119. The thumbnail image 120 located at the right end of the second row is a thumbnail image of a moving image file. A sign 133 indicating a moving image is displayed on the thumbnail image 120.

The thumbnail images 121 and 122 located at the left end and center of the third row are thumbnail images of still image files. Signs 134 and 135 indicating a still image file are displayed on the thumbnail images 121 and 122, respectively. The thumbnail image 123 located at the right end of the third row is a thumbnail image of a moving image file. A sign 136 indicating that the file type is a moving image file type is displayed on the thumbnail image 123.

When a thumbnail image is selected on the list view screen, a playback screen is displayed. The playback screen displays the image corresponding to the selected thumbnail image. More specifically, when a moving-image-file thumbnail image is selected, the image corresponding to the beginning of the moving image file is displayed on the playback screen. When a bookmark thumbnail image is selected, the moving image file is displayed on the playback screen starting from the position at which the bookmark is registered. When a still-image-file thumbnail image is selected, the still image file is displayed on the playback screen.

FIG. 12 shows a playback screen 137 in a case where a bookmark thumbnail image is selected. The playback screen 137 shown in FIG. 12 is a playback screen assuming that a position at which a bookmark is registered is a playback start position. A sign 138 indicating a moving image file, and a "book mark" sign 39 indicating that playback is to start from the position of the bookmark are displayed in the upper portion of the playback screen 137. A slide bar 140 indicating the position of the bookmark with respect to the total playback time of the file is displayed in the lower portion of the playback screen 137, and a date capture date 141 is displayed below the slide bar 140. The slide bar 140 includes a mark M indicating the playback time of the currently selected bookmark. The slide bar 140 also includes marks m1 and m2 indicating the playback times of the remaining bookmarks.

The list view screen 137 according to the embodiment of the present invention displays thumbnail images of different types of files such as a moving image file and a still image file, and thumbnail images of bookmarks registered in the moving image file at the same time.

A sign indicating whether the file type is a moving image file type or a still image file type, and a sign indicating whether the file has a bookmark are displayed on each of the thumbnail images.

The list view screen 137 displays different types of files and bookmarks linked to those files at the same time, thus allowing a user to seamlessly select files without changing a selection screen.

The structure of the view-advancing screen will be described with reference to FIGS. 13A to 13E. A view-advancing screen 61 advances through and displays still images one-by-one. Still images of files are sequentially displayed on the view-advancing screen 61. If the files have bookmarks, the still images are displayed one-by-one in order of the registration times of the bookmarks.

A sign indicating a file type, a sign indicating a still image of a bookmark, and a playback start time of the bookmark are displayed on the view-advancing screen 61. A user sends an instruction to play back a file while confirming such visual information.

Figure 13A:
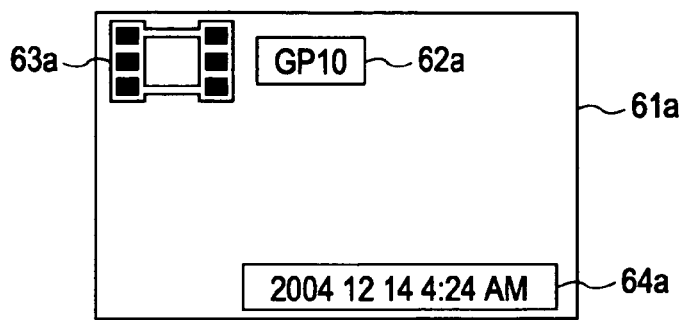
FIGS. 13A to 13E are diagrams showing an example of the flow of display on a view-advancing screen.
Figure 13B:
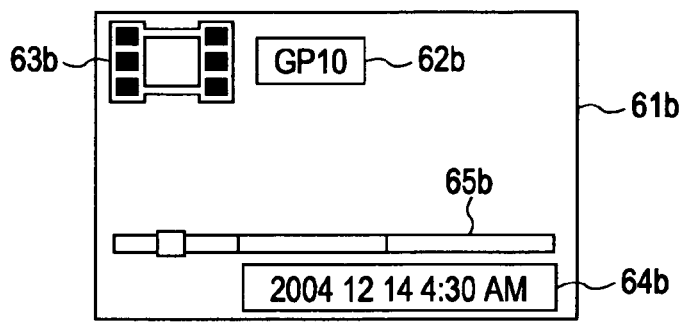

FIGS. 13A to 13E show an example of the flow of display on the view-advancing screen 61. A view-advancing screen 61a shown in FIG. 13A displays an image corresponding to the beginning of a moving image file. A "GP" sign 62a indicating that there is a registered bookmark and a sign 63a indicating a moving image file are displayed on the upper portion of the view-advancing screen 61a. A file capture date 64a is displayed on the lower portion of the view-advancing screen 61a. When the next/forward button 108 is pressed in a state where the view-advancing screen 61a shown in FIG. 13A is displayed, a view-advancing screen 61b shown in FIG. 13B is displayed.

Figure 13C:
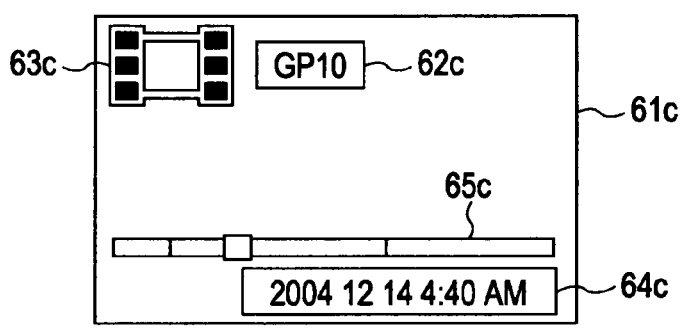

On the view-advancing screen 61b shown in FIG. 13B, a still image at the position at which the first bookmark is registered is displayed. The view-advancing screen 61b further displays a slide bar 65b so as to overlie the still image. The slide bar 65b indicates the playback start time of the first bookmark with respect to the total time of the file. The view-advancing screen 61b shown in FIG. 13B further displays a "GP" sign 62b indicating that there is a registered bookmark, a sign 63b indicating a moving image file, and a file capture date 64b. When the next/forward button 108 is pressed in a state where the view-advancing screen 61b shown in FIG. 13B is displayed, a view-advancing screen 61c shown in FIG. 13C is displayed.

Figure 13D:
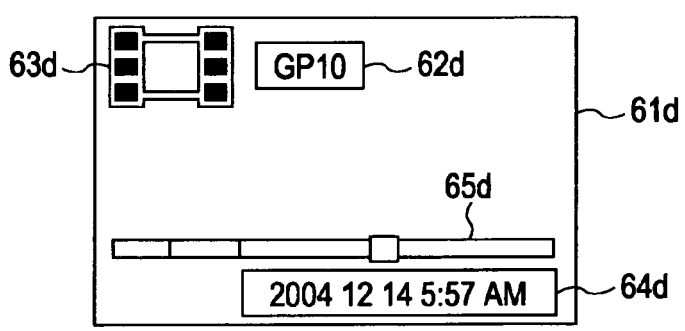

On the view-advancing screen 61c, a still image at the position at which the second bookmark is registered is displayed. The view-advancing screen 61c shown in FIG. 13C further displays a slide bar 65c, a "GP" sign 62c indicating that there is a registered bookmark, a sign 63c indicating a moving image file, and a file capture date 64c so as to overlie the still image. When the next/forward button 108 is pressed in a state where the view-advancing screen 61c shown in FIG. 13C is displayed, a view-advancing screen 61d shown in FIG. 13D is displayed.

On the view-advancing screen 61d, a still image at the position at which the third bookmark is registered is displayed. The view-advancing screen 61d shown in FIG. 13D further displays a slide bar 65d, a "GP" sign 62d indicating that there is a registered bookmark, a sign 63d indicating a moving image file, and a file capture date 64d so as to overlie the still image. When the next/forward button 108 is pressed in a state where the view-advancing screen 61d shown in FIG. 13D is displayed, a view-advancing screen 61e shown in FIG. 13E is displayed.

The four view-advancing screens 61a to 61d shown in FIGS. 13A to 13D allow the user to select four playback start positions registered in one file. The view-advancing screen is displayed according to the temporal order of playback start positions. The slide bar 65 and the file capture date 64 also vary in accordance with a change of the playback start position over time.

Figure 13E:
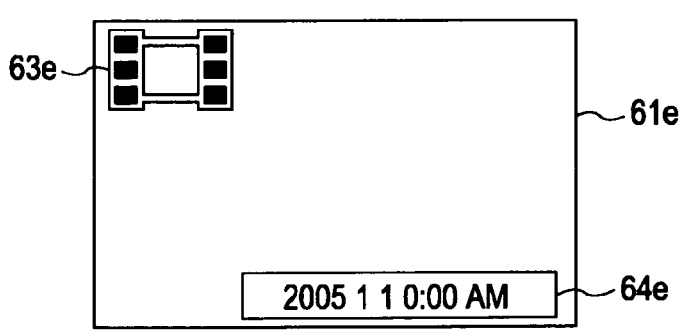

On the view-advancing screen 61e shown in FIG. 13E, a still image of the next file is displayed. The view-advancing screen 61e further displays a sign 63e indicating that the next file is a moving image file, and a file capture date 64e.

The view-advancing screen 61 provides display in order of the playback start times without distinguishing files and bookmarks, and facilitates user search. Furthermore, the view-advancing screen 61 allows a user to visually confirm a file type, the presence or absence of a bookmark, a playback date, and so forth. The slide bar 65 indicating a position of a bookmark is also provided.

The operation of the selection screen generating unit 107 will be described. Before describing the operation of the selection screen generating unit 107, a structure of an index file 143 read from the HDD 102 will be described. The index file 143 includes a structure of a folder, attributes of files, and start positions of bookmarks. The index file 143 has a similar structure to that of the index file 8 shown in FIG. 3.

Figure 14:
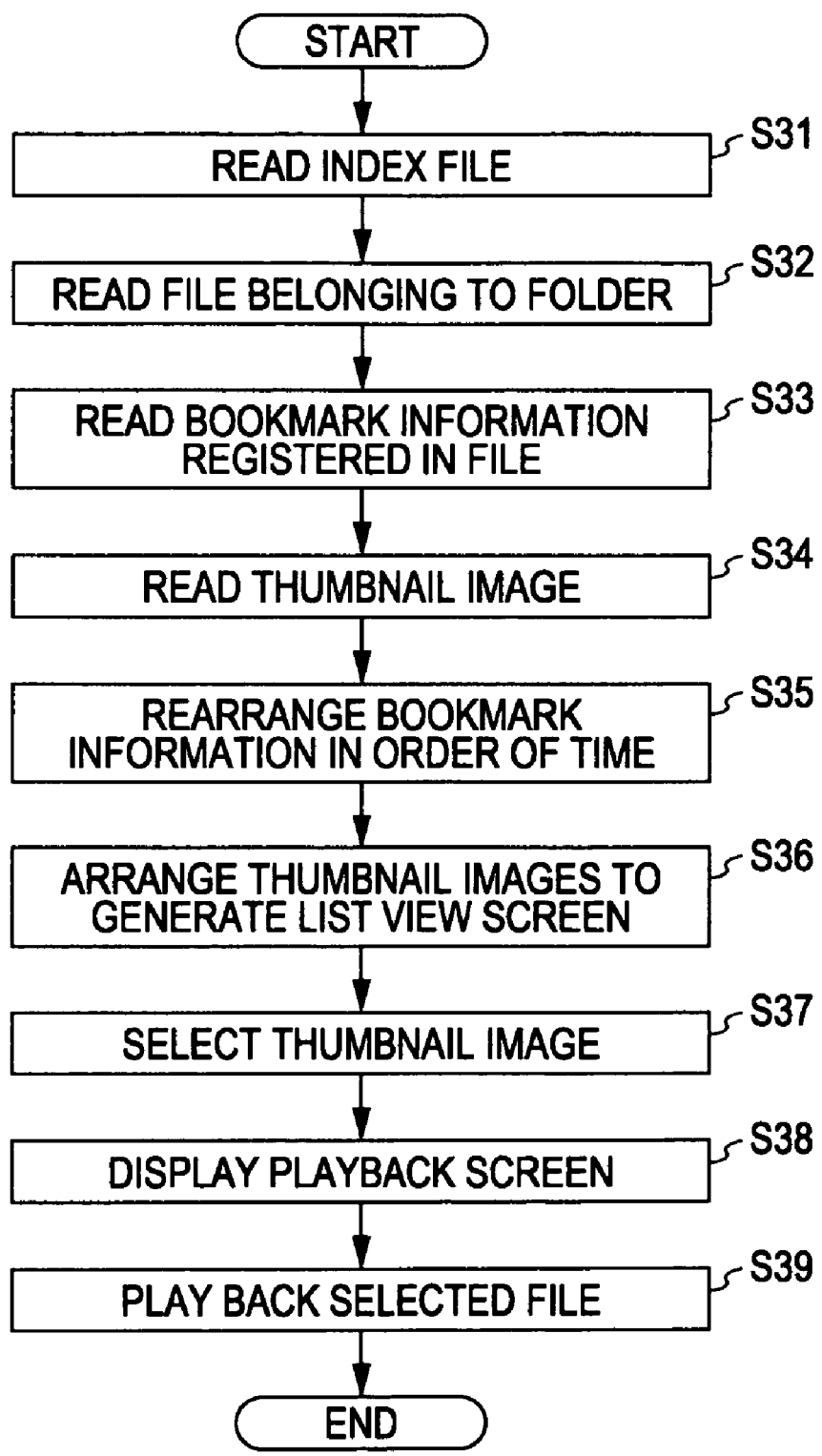
FIG. 14 is a flowchart showing a procedure for generating a list view screen.

FIG. 14 is a flowchart showing a procedure for generating a list view screen. In step S31, the selection screen generating unit 107 reads the index file 143. In step S32, the selection screen generating unit 107 reads the file information 23 linked to the folder information 22 in the index file 143, and reads the thumbnail images 20 linked to the file information 23. In step S33, the selection screen generating unit 107 reads the bookmark information 24 linked to the file information 23. In step S34, the selection screen generating unit 107 reads the thumbnail images 20 linked to the file information 23.

The processing of steps S32 to S34 will be described in detail with reference to FIG. 4. The folder information 22 with index number 0001 is described at the top of the property file 17 shown in FIG. 4. The folder information 22 is linked to files belonging to the folder, namely, the file information 23a with index number 0002 and the file information 23b with index number 0003.

The file information 23a with index number 0002 is linked to the image file 50a with image file number 0001 and the thumbnail image 20a with index number 0001. The file 23b with index number 0003 is linked to the image file 50b with image file number 0002, the bookmark information 24a, 24b, and 24c with index numbers 0004, 0005, and 0006, respectively, and the thumbnail image 20b with index number 0002.

The bookmark information 24a with index number 0004 linked to the file information 23b has a link to the thumbnail image 20c with index number 0003; the bookmark information 24b with index number 0005 has a link to the thumbnail image 20d with index number 0004; and the bookmark information 24c with index number 0006 has a link to the thumbnail image 20e with index number 0005. The selection screen generating unit 107 reads the information associated with the files according to those links.

In step S35, the selection screen generating unit 107 rearranges the read pieces of bookmark information 24 in order of the time information. In step S36, the selection screen generating unit 107 arranges the thumbnail images 20 of the files and the thumbnail images 20 of the bookmarks in order of the playback start positions to generate a list view screen.

In step S37, when the user selects one of the thumbnail images 20, then, in step S38, the selection screen generating unit 107 displays the playback screen corresponding to the selected thumbnail image 20. In step S39, the selection screen generating unit 107 starts playback from the playback start position corresponding to the selected thumbnail image 20.

Figure 15:
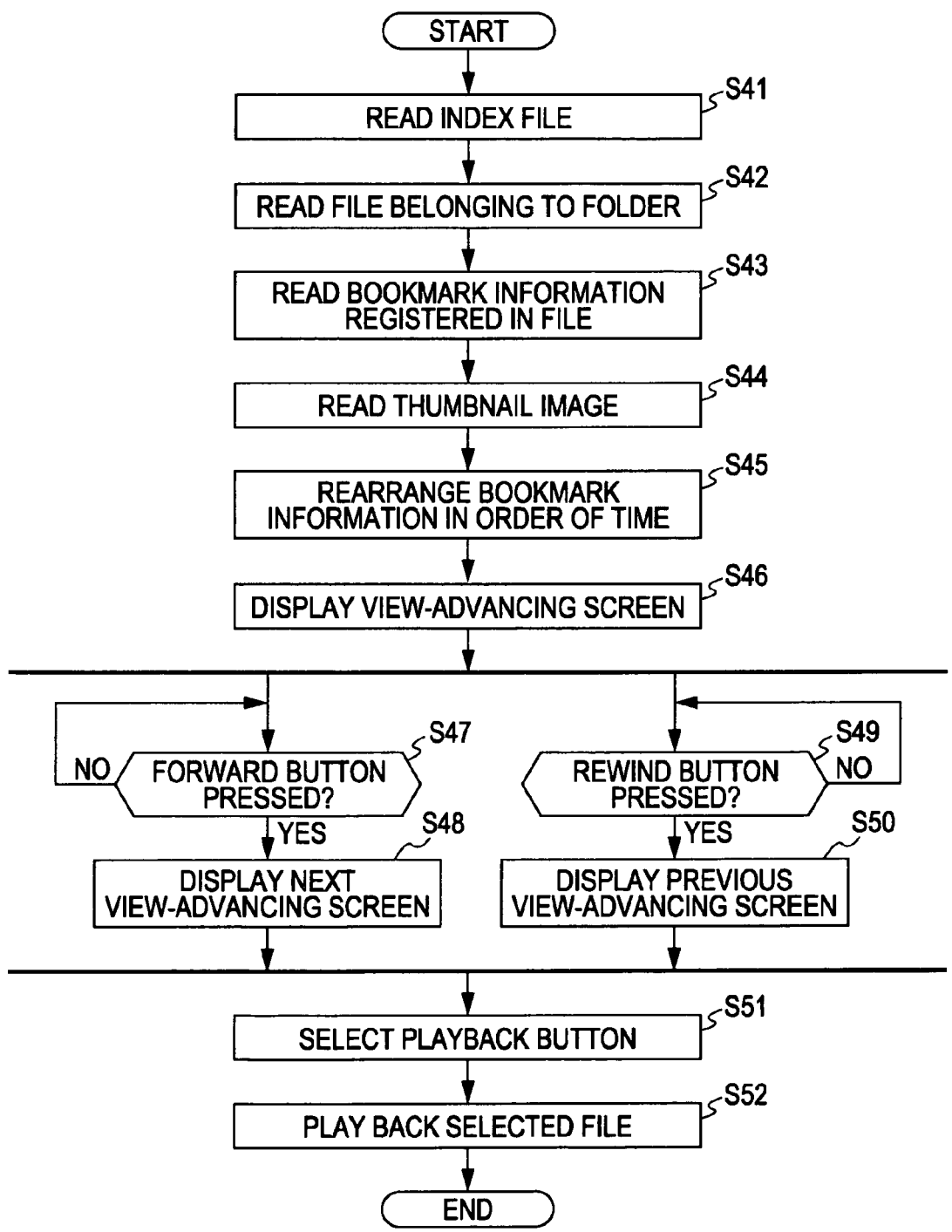
FIG. 15 is a flowchart showing a procedure for generating a view-advancing screen.

FIG. 15 is a flowchart showing a procedure for generating the view-advancing screen 61. In step S41, the selection screen generating unit 107 reads the index file 143. In step S42, the selection screen generating unit 107 reads the file information 23 linked to the folder information 22 in the index file 143. In step S43, the selection screen generating unit 107 reads the bookmark information 24 linked to the file information 23. In step S44, the selection screen generating unit 107 reads the thumbnail images 20 linked to the file information 23 and the thumbnail images 20 linked to the bookmark information 24. The processing of steps S42 to S44 by the selection screen generating unit 107 is the same as the processing of steps S32 to S34 in the process for generating the list view screen 114, and a description thereof is thus omitted.

In step S45, the selection screen generating unit 107 rearranges the read pieces of bookmark information 24 in order of the time information. In step S46, the selection screen generating unit 107 displays the view-advancing screen 61 on the display unit 105.

In step S47, when the next/forward button 108 is pressed, then, in step S48, the selection screen generating unit 107 displays the next view-advancing screen 61 on the display unit 105. The view-advancing screen 61 displays a still image of the current file or a still image of a bookmark of the previously displayed file. In a case where the still image of the bookmark is displayed, the scroll bar 65 indicating the playback start position of the bookmark is displayed. The selection screen generating unit 107 displays the next view-advancing screen 61 each time the next/forward button 108 is pressed. In step S49, if the previous/rewind button 109 is pressed, then, in step S50, the selection screen generating unit 107 displays the previous view-advancing screen 61 on the display unit 105.

If the playback button 110 is selected in step S51, then, in step S52, the selection screen generating unit 107 plays back the file corresponding to the selected view-advancing screen 61. If the selected view-advancing screen 61 corresponds to a bookmark, playback is started from the playback start position of the bookmark.

As described above, the playback apparatus 101 according to the embodiment of the present invention generates the list view screen 114 and the view-advancing screen 61 as screens for selecting a playback start position. The list view screen 114 displays both the thumbnail images 20 of files and the thumbnail images 20 of bookmarks, thus allowing a user to seamlessly select playback starting from the beginning of the file and from a position of a bookmark.

On the view-advancing screen 61, still images of files and still images at addresses registered as bookmarks are arranged in order, and are displayed by sequentially advancing through the images. The view-advancing screen allows a user to search for the files and the bookmarks by performing the same operation without distinguishing them.

While the playback apparatus 101 has been described, any electronic apparatus having a file playback function may be used. The index file may be a management file in which a bookmark can be registered.

While the registration of a bookmark in a moving image file has been described, stream data of any file other than a moving image file, such as an audio file, may be used.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic apparatus comprising:
   a stream content data obtaining unit to obtain stream content data;
   a file generating unit to generate stream files of content by converting the obtained stream data into a predetermined file format;
   a recording unit to record the generated stream files;
   an index file generating unit to generate an index file including a plurality of pieces of file information for the stream files recorded in the recording unit, each of the pieces of file information including first link information linking to one of the stream files;
   a bookmark information registering unit to, in response to an instruction to register a bookmark during the obtaining of the stream data, record second link information for linking to a bookmarked position of the recorded stream file in the piece of file information of the index file; and
   a playback managing unit to control display of a first thumbnail image generated from a first image representing the content of the recorded stream file and a second thumbnail image generated from a second image representing the content of the recorded stream file corresponding to a playback start position in the recorded stream file at which the bookmark is registered in different sizes in a mixed manner with a display element to indicate that each of the first and second thumbnail images is associated with the recorded stream file and to visually distinguish the second thumbnail image as representing a registered bookmark for the recorded stream file from the first thumbnail image representing the content of the recorded stream file,
   wherein at least one of the units includes a processor.

2. The electronic apparatus according to claim 1, further comprising an instruction receiving unit to receive a user instruction,
   wherein the second thumbnail image displayed on the display unit is selected by the instruction receiving unit, thereby playing back the image stream data based on the bookmark information corresponding to the selected second thumbnail image.

3. The electronic apparatus according to claim 1, further comprising an image capturing unit to capture an image of a subject, wherein
   the stream data obtaining unit obtains image stream data that is output from the image capturing unit, and
   the bookmark information registering unit stores position information of the image stream data in memory when the instruction to register the bookmark is given, and records the position information in the recording unit as bookmark information.

4. An electronic apparatus, comprising:
   an index file generating unit to generate an index file including a plurality of pieces of file information for stream files of content recorded on a predetermined recording medium, each of the pieces of file information including first link information linking to one of the stream files;
   a stream data playback unit to read and play back the stream files from the recording medium;
   a bookmark information registering unit to, in response to an instruction to register a bookmark during the playback of the stream files, record second link information for linking to a bookmarked position in the piece of file information for the played back stream file; and
   a playback managing unit to read the index file and play back the stream files, wherein the playback managing unit controls display of a first thumbnail image generated from a first image representing the content of an associated stream file and a second thumbnail image generated from a second image representing the content of the associated stream file corresponding to a playback start position of the associated stream file at which a bookmark is registered in different sizes in a mixed manner with a display element to indicate that each of the first and second thumbnail images is associated with the associated stream file and to visually distinguish from the second thumbnail image as representing a registered bookmark for the associated stream file from the first thumbnail image representing the content of the associated stream file;
   wherein at least one of the units includes a processor.

5. An electronic apparatus, comprising:
   a playback managing unit including a processor to read a stream file of content, a first thumbnail image generated from a first image representing the content of the stream file and a second thumbnail image generated from a second image representing the content of the stream file corresponding to a playback start position of the stream file at which a bookmark is registered, and to perform a playback operation from the beginning of the stream file or from a playback start position at which the bookmark is registered,
   wherein the playback managing unit is for controlling display of the first thumbnail image and the second thumbnail image in different sizes in a mixed manner with a display element to indicate that each of the first and second thumbnail images is associated with the stream file and to visually distinguish the second thumbnail image as representing a registered bookmark for the stream file from the first thumbnail image representing the content of the stream file.

6. The electronic apparatus according to claim 5, wherein the playback managing unit provides a user with the beginning of the stream file and playback start positions registered in the bookmark, and performs the playback operation from one of the playback start positions specified by the user.

7. A playback management method, comprising:
obtaining stream content data;
generating, by a processor, stream files of content by converting the obtained stream data;
generating, by the processor, an index file including a plurality of pieces of file information of the stream files, each of the pieces of file information including first link information linking to one of the stream files; and
in response to an instruction to register a bookmark during the obtaining of the stream data, recording by the processor second link information for linking to a bookmarked position of the generated stream file in the piece of file information of the index file;
controlling, by the processor, display of a first thumbnail image generated from a first image representing the content of the generated stream file and a second thumbnail image generated from a second image representing the content of the generated stream file corresponding to a playback start position in the generated stream file at which the bookmark is registered in different sizes in a mixed manner with a display element to indicate that each of the first and second thumbnail images is associated with the generated stream file and to visually distinguish the second thumbnail image as representing a registered bookmark for the generated stream file from the first thumbnail image representing the content of the generated stream file.

8. A playback management method, comprising:
generating by a processor an index file including a plurality of pieces of file information for stream files of content recorded on a predetermined recording medium, each of the pieces of file information including first link information linking to one of the stream files;
reading and playing back the stream files from the recording medium;
in response to an instruction to register a bookmark during the playback of the stream files, recording second link information for linking to a bookmarked position in the piece of file information for the played back stream file; and
controlling display of a first thumbnail image generated from a first image representing the content of an associated stream file and a second thumbnail image generated from a second image representing the content of the associated stream file corresponding to a playback start position in the associated stream file at which a bookmark is registered in different sizes in a mixed manner with a display element to indicate that each of the first and second thumbnail images is associated with the associated stream file and to visually distinguish the second thumbnail image as representing a registered bookmark for the associated stream file from the first thumbnail image representing the content of the associated stream file.

9. A display control apparatus, comprising:
a selection screen generating unit including a processor to generate a selection screen when a stream file of content and in which a bookmark is registered is input, the selection screen being configured such that a first thumbnail image generated from a first image representing the content of the stream file and a second thumbnail image generated from a second image representing the content of the stream file corresponding to a bookmark registration position at which the bookmark is registered in the stream file are sequentially arranged in different sizes in a mixed manner with a display element to indicate that each of the first and second thumbnail images is associated with the stream file and to visually distinguish the second thumbnail image as representing a registered bookmark for the stream file from the first thumbnail image representing the content of the stream file.

10. The display control apparatus according to claim 9, wherein the selection screen generating unit starts playback of the stream file from the beginning of the stream file when the first thumbnail image is selected on the selection screen, and starts playback of the stream file from the bookmark registration position as a playback start position when the second thumbnail image is selected on the selection screen.

11. The display control apparatus according to claim 9, wherein the selection screen generating unit displays on the selection screen as the display element a graphical representation on each of the first and second thumbnail images on the selection screen.

12. The display control apparatus according to claim 9, wherein the selection screen generating unit generates a list view screen formed by displaying a plurality of images side-by-side on one selection screen.

13. The display control apparatus according to claim 9, wherein the selection screen generating unit generates a view-advancing screen on which the first image representing the stream file and the second image representing the bookmark registration position in the stream file are displayed by sequentially advancing through the first and second images one image at one time.

14. The display control apparatus according to claim 9, wherein the selection screen generating unit uses an index file including file information describing an attribute of the stream file and bookmark information describing a playback start position on the file, the file information and the bookmark information being linked by an index, and obtains the bookmark information from the index file.

15. The display control apparatus according to claim 9, wherein the selection screen generating unit generates a view-advancing screen on which the first image representing the stream file and a plurality of the second images representing the respective bookmark registration positions are displayed by sequentially advancing through the first and second images one image at one time, the plurality of the second images being displayed by sequentially advancing through the second images in temporal order of the respective bookmark registration positions.

16. A display control method, comprising:
inputting a stream file of content and in which a bookmark is registered;
generating by a processor a selection screen on which a first thumbnail image generated from a first image representing the content of the stream file and a second thumbnail image generated from a second image representing the content of the stream file corresponding to a bookmark registration position at which the bookmark is registered in the stream file are sequentially arranged in different sizes in a mixed manner with a display element to indicate that each of the first and second thumbnail images is associated with the stream file and to visually distinguish the second thumbnail image as representing a registered bookmark for the stream file from the first thumbnail image representing the content of the stream file; and starting playback of the stream file from the beginning of the stream file when the first thumbnail image is selected on the selection screen, and starting playback of the stream file from the bookmark registration position as a playback start position when the second thumbnail image is selected on the selection screen.

17. An electronic apparatus, comprising:

a storing means for storing information of a bookmark associated with a stream file;

a selection screen generating means including a processor to generate a selection screen configured such that a first thumbnail image generated from a first image representing a first stream file and a second thumbnail image generated from a second image representing the content of the first stream file corresponding to a bookmark registration position at which the bookmark is registered in the first stream file are sequentially arranged in different sizes in a mixed manner with a display element to indicate that each of the first and second thumbnail images is associated with the first stream file and to visually distinguish the second thumbnail image as representing a registered bookmark for the first stream file from the first thumbnail image representing the content of the first stream file; and a display control means for controlling display of the selection screen generated by the selection screen generating means.

* * * * *